March 23, 1965     H. F. GEIGER     3,174,226

SLOPE GAUGE

Filed May 5, 1961

HANS F. GEIGER
INVENTOR.

BY *Robert A. Spray*

ATTORNEY

United States Patent Office 3,174,226
Patented Mar. 23, 1965

3,174,226
SLOPE GAUGE
Hans F. Geiger, 5845 N. New Jersey St.,
Indianapolis, Ind.
Filed May 5, 1961, Ser. No. 108,174
4 Claims. (Cl. 33—89)

This invention relates to slope-indicating devices, such as used for the determining of the slope of a member and for installing of a member at a specified slope.

It is an object of the present invention to provide a novel slope gauge which is relatively inexpensive to produce, yet which is convenient and accurate in its use.

A further object of my invention is to provide a slope gauge of novel construction which is calibrated in a manner which will give, by direct reading, the slope in desired and conveniently usable terms, showing the "rise per foot run" in the embodiment herein illustrated.

Another object of my invention is to produce a new and useful slope gauge which is conveniently and accurately usable with but little instruction to a workman as to its use.

A slope gauge according to my invention is usable in a variety of situations where it is desired to determine the slope of an existing member, to lay out the slope in the erection or installation of a member, and even by a draftsman in drawing members to a certain slope.

For example, it may be used to determine the slope of an existing roof; it may be used to lay off slopes in the construction of boats; it may be used in the installation of sewer pipes and the like, and to determine the slope of existing pipes; it may be used to slope a driveway, parking lot, or the like; it may be used in forming and constructing retaining walls to a desired slope; it may be used in steel and sheet metal installations and in the fabrication of various types of such members where a certain slope is desired. Other uses will be apparent, with regard to both the measuring of slopes and the establishing and installation of members at desired slopes.

In carrying my invention in an illustrative embodiment, I provide a slope gauge comprising a frame in the form of a pair of perpendicularly related members, one of which is calibrated to provide a slope-reading scale and the other of which is a base-like member having a locating abutment; a third or indicating member is provided and is adapted to be located by said abutment, and the third member has level-indicating means. Other features of convenience and utility, providing varied desired service characteristics in varying slope-concerned situations, are also provided, simply and economically.

Thus in an illustrative use, the device is placed against a sloping member with the base along the slope of an associated member whose slope is to be determined, and the third member is adjusted to a horizontal orientation; the location along the calibrated member overlain by the indicating member thus reads the slope of the base-like member and thus also the slope of the associated member. A direct reading of slope, in terms of "rise per unit run" is thus conveniently and accurately obtained.

The description so far given is introductory and is rather general; and the foregoing and further and more particular objects, features, and advantages of the present invention, co-operating to achieve the desirability and convenience of the slope gauge, will further appear in the following, more detailed description, reference being had to the accompanying drawings, in which.

Figure 2:
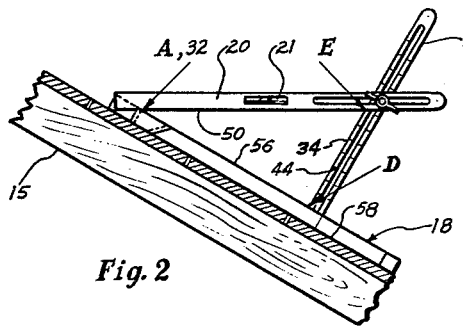
FIG. 2 shows the slope gauge of FIG. 1 in an illustrative use, determining the slope of an existing roof.

As shown in the drawings, my invention provides a device for measuring slopes, for example, the slope of a roof 15 (FIG. 2). Its use in that respect will be explained below, showing how the device gives a desired reading of slope in terms of height of rise or fall per unit of span.

Figure 1:
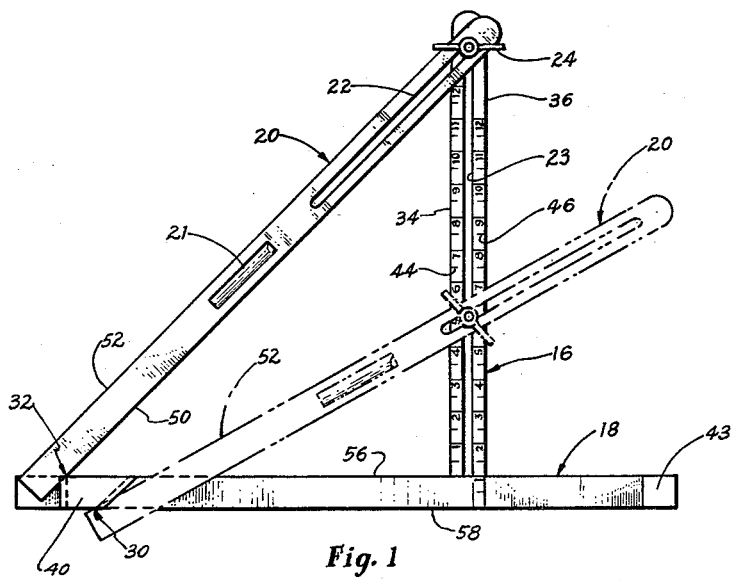
FIG. 1 is an elevation view of a slope gauge according to the illustrated embodiment of my invention.
Figure 5:
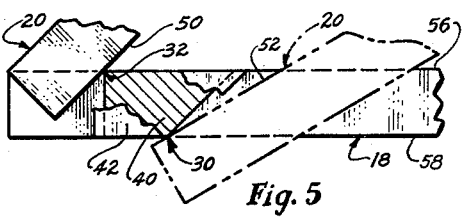
FIG. 5 is an enlarged, fragmental view illustrating a portion of the slope gauge of FIG. 1.
Figure 4:
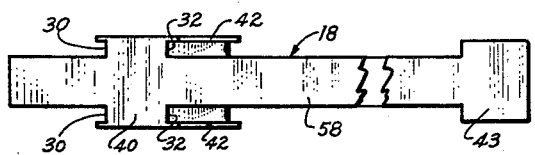
FIG. 4 is an enlarged bottom view of a portion of the slope gauge of FIG. 1.

The structural detail will be more apparent in FIGS. 1, 4, and 5. As the invention is there shown, the device in an illustrative embodiment of the invention generally comprises a frame shown as provided by a pair of members 16–18, rigidly inter-connected in a perpendicular relationship providing a sort of an L or an offset T configuration, with the member 16 forming a "leg" of a T, and the member 18 forming a base or "cross-piece" of the T. A third main member is a diagonal member 20 having a level indicator 21; and the relation of this member 20 will be apparent as the description proceeds.

The member 20 and the member 16, in the form shown, are each provided with an elongated slot 22 and 23, respectively, through which extends a bolt 24 for adjustably and releasably interconnecting the diagonal member 20 with the leg-member 16. Two positions of the diagonal member 20 are illustrated in FIG. 1.

The member 18 in the form shown is provided with a pair of locating abutments 30 and 32. These abutments, which are optionally usable, each provide a fixed abutment to locate the member 20 with respect to the member 18, as the device is used as explained below.

The outer abutment 32 is a pre-determined distance from the leg-member 16, the distance being here twelve inches, and specifically twelve inches from the adjacent edge 34 of the member 16; and the abutment 30 is likewise a pre-determined distance, here twelve inches, from the leg 16, and more specifically, from the non-adjacent edge 36 of the leg 16. These distances, as will be explained, provide a feature contributing to the slope-gauge geometry and utility of the device.

The abutments 30 and 32 in the illustrated embodiment extend laterally outward from member 18 on a boss 40, with the boss 40 being notched to provide that the abutments 30 and 32 lie between the leg 18 and an overlying tab 42, for providing definite and positive seating of the diagonal member 20. As shown, there are abutments 30 and 32 on both sides of the leg 18, providing for the seating of diagonal member 20 on either side of leg 18 as may be desired in use.

The end-portion of leg 18 opposite the boss 40 is provided with a somewhat similar boss 43 to provide support for the device when it is laid on its side; and the boss 43 and the adjacent portion of leg 18 serve as a handle for the device.

Calibration markings 44 are provided on the inner edge 34 of leg 16; these calibrations are shown as extending from a beginning on the upper edge of leg 18, on the same plane as the abutment 32, and extend along leg 16 as shown for twelve inches. Somewhat similarly, calibration markings 46 are provided on the outer edge 36 of leg 16; but the calibration markings 46 begin as shown on the lower edge of leg 18, on the same place as abutment 30, and as shown the calibration markings 46 extend along leg 16 for twelve inches.

The calibration markings 44 and 46 desirably are provided on both sides of leg 16, permitting convenience of reading and use, with diagonal member 20 on either side of the legs 16 and 18. The reading scales provided by calibrations 44 and 46 are illustrated only schematically, and in practice the scales will be finely calibrated for the desired accuracy, and if desired may be shown in degrees or other desired designation such as percent rise or fall. The calibrations are uniform; although if it is desired to provide the member 16 in arcuate form or to slant member 16 so as to make the angle at "D" acute, as may be desired for compactness, the calibrations would be trigonometrically or geometrically laid out to indicate slope in the desired terms.

In an illustrative use, as shown in FIG. 2, the device is placed with the leg 18 being along the sloping surface of roof 15, the leg 18 serving as a base or slope-reference member having the same spatial slope orientation as the roof 15. The diagonal member 20 is then laid in abutting engagement with one of the abutments 30 or 32 (here 32), and the diagonal member 20 is adjusted to a horizontal orientation as indicated by the level indicator 21. The bolt 24 is then tightened to preserve the adjustment of member 20 for the reading by the user.

Thus in FIG. 2, the reading is taken on calibration 44 of inner edge 34 of leg 16, at the location "E" therealong crossed by the lower edge 50 of diagonal member 20. The reading appears to be about at the "seven-inch" mark, meaning that the slope of the roof is "seven inches rise per one foot run."

Figure 3:
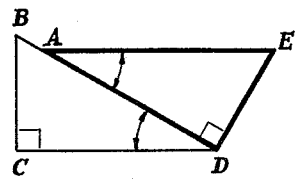
FIG. 3 is a geometric construction to show how the observed reading on the slope gauge does give the slope to be measured.

The geometry of triangle AED of FIG. 2 as showing the length ED to be "rise per one foot run," established by the angle EAD with member 20 and thus line AE oriented with reference to a known reference line in space, is indicated in FIG. 3, and may be proven as follows:
To prove:

That the observed length ED is "rise per twelve-inch run" of the roof:

(a) All lines and angles are in a single plane, that plane being perpendicular to the plane of the roof, the plane also being perpendicular to a horizontal line in the plane of the roof, such as a horizontal ridge line of the roof.

(b) AE (a length along the member 20) is horizontal, because set by a level indicator 21.

(c) AD (a length along the member 18) is twelve inches, because the device is constructed to provide the exact twelve-inch length for AD, as measured between abutment 32 and scale-edge 34.

(d) Angle ADE is a right angle, because the device is so constructed that AD is perpendicular to ED; the triangle ADE is thus a right triangle.

(e) CD is the same length (twelve inches) as AD, by drawing.

(f) CD is drawn parallel to AE; and CD is thus horizontal, because it is parallel to AE, which is horizontal.

(g) CD thus is a twelve-inch "run" because it is twelve inches long, and is horizontal.

(h) BC is drawn perpendicular to CD; thus angle BCD is a right angle; and the triangle BCD is a right triangle.

(i) BC is thus vertical, because it is perpendicular to horizontal line CD.

(j) Angle EAD is equal to angle ADC, because: each has a leg formed along one of the parallel lines AE and CD, each has the other leg formed along a single line AD which intersects the parallel lines AE and CD, the angles EAD and ADC lie on opposite sides of that intersecting line AD.

(k) BC equals ED in length, because BC equals the length CD times the tangent of angle BDC, and ED equals the length AD times the tangent of the angle EAD; and it has already been shown that CD equals AD and that angle ADC equals angle EAD. Another proof that BC equals ED, is that triangle BDC is congruent to the triangle EAD, for each triangle has two angles and an included side respectively equal to the same features of the other triangle.

(l) The line AD is at the same slope of the roof, for AD is parallel to the lower edge 58 of member 18 which lies along the roof.

(m) The observed length ED (noted on calibration 44 along edge 34 of member 16) is thus the "rise per twelve-inch run," because it is equal to length BC which is the vertical leg or "rise" of a right triangle whose other leg is the twelve-inch horizontal "run" CD.

Thus, in FIG. 1, assume the device has been previously placed along a sloping member and the member 20 has been rotated to a horizontal position and bolt 24 tightened; and assume that the device has now been oriented to the FIG. 1 position for reading: In the full line position of diagonal member 20, using abutment 32 as was explained in connection with FIG. 2, the reading in FIG. 1 would be where lower edge 50 of diagonal member 20 intersects inner edge 34 of leg 16; and the rise per foot run would appear to read about eleven and seven-eighths inches.

In FIG. 1, in the chain line position, with diagonal member 20 having been adjusted using the abutment-guide 30, the reading is taken where the upper edge 52 of diagonal member 20 intersects outer edge 36 of leg 16; and the reading would appear to be about six and three-fourths inches rise per foot run.

For convenience of use and to assure that the reading is observed on the correct scale having reference to which of the abutments 30 or 32 have been used as a locating guide, the device is desirably color coded: For example, edges 50 and 34 and the abutment 32 and the upper edge 56 of member 18 might be striped with blue; and edges 52, 36, and the abutment 30 and the lower edge 58 of member 18 might be striped with red.

A slope gauge according to the concepts of the present invention thus provides many advantages of utility, convenience of use, and economy, achieving the foregoing and other advantages pointed out in the description and inherent in the inventive concepts; and such a device is conveniently used in both determining the slope of an existing member and in laying out and installing a member to a specified slope or grade.

It will be understood that modifications and variations may be effected without departing from the scope of the novel concepts of the present invention. Accordingly, my invention is not to be limited to the specific form or arrangement of parts herein described and shown.

I claim as my invention:

1. A slope gauge, comprising: a frame comprising a reference member and a prependicularly related reading scale; the reference member provided with a pair of locating abutments, a first one on the lower edge and the other on the upper edge of said reference member; the reading scale having two calibration systems, a first one extending from the lower edge of said reference member and a set distance from said first abutment, and the second calibration system extending from the upper edge of said reference member and a set distance from said other abutments; and an indicating member adapted to engage a selected one of said abutments and to overlie the related calibration system and to be set at a certain spatial orientation, to provide that the related calibration system overlain will indicate a reading of the slope of the reference member in space.

2. A slope gauge, comprising: a calibrated scale; a base; a locating abutment carried by said base and provided by a recess provided in a boss extending laterally from said base; an indicating member adapted to abuttingly engage said abutment and to extend over said calibrated scale; the said indicating member being movably adjustable with respect to said scale; a level indicator carried by said indicating member; and means to permit said indicating member to be adjusted to a horizontal orientation; the parts constructed and arranged to provide that the scale reading, with the indicating member oriented horizontally and with the base resting upon an associated sloping surface, will thereby indicate the slope of said surface.

3. A slope gauge, comprising: a reference member adapted to be placed along an associated sloping member whose slope is to be determined; said reference member provided with an operative reference edge having at least two spaced points adapted to contact said associated sloping member and thus establish the orientation of said operative edge at the same angle of slope as is the slope of said associated sloping member in space; said reference member also being provided with a locating abutment in or closely adjacent to the plane of said operative reference edge; an indicating member provided with means to indicate the slope of said indicating member with reference to a horizontal plane in space; said indicating member being adjustably related to said reference member, and engaging said locating abutment, to permit said indicating member to be placed at a known spatial slope orientation while said reference member is positioned along said associated sloping member with said operative reference edge thereof in the same spatial slope orientation as said associated sloping member; and slope-reading scale means carried by the reference member and beginning at a point closely adjacent said reference edge to designate the angular relationship of said reference member and said indicating member when they are so oriented to indicate the slope of the said associated member.

4. A slope gauge, comprising: a frame comprising a reference member and a reading scale; the reference member provided with a pair of locating abutments, a first one on the lower edge and the other on the upper edge of said reference member; the reading scale having two calibration systems, a first one extending from a first edge of said reference member and a set distance from said first abutment, and the second calibration system extending from a second edge of said reference member and a set distance from said other abutment; and an indicating member adapted to engage a selected one of said abutments and to overlie the related calibration system and to be set at a certain spatial orientation, to provide that the related calibration system overlain will indicate a reading of the slope of the reference member in space.

References Cited by the Examiner
UNITED STATES PATENTS

| | | | |
|---|---|---|---|
| 607,907 | 7/98 | Allen | 33—94 |
| 642,888 | 2/00 | Van Vliet | 33—89 |
| 811,739 | 2/06 | Pelfrey et al. | 33—207 |
| 1,100,543 | 6/14 | Daniel | 33—145 |
| 1,370,605 | 3/21 | Magill | 33—92 |
| 1,483,242 | 2/24 | Pearce | 33—145 X |
| 1,653,561 | 12/27 | Gray | 33—94 |

FOREIGN PATENTS 5,511/18  12/81  Great Britain.

ISAAC LISANN, *Primary Examiner.*